United States Patent Office 2,752,337
Patented June 26, 1956

2,752,337

STEROID ENAMINES

Milton E. Herr, Kalamazoo, Mich., assignor to The Upjohn Company, Kalamazoo, Mich., a corporation of Michigan No Drawing. Application June 28, 1951,
Serial No. 234,163

34 Claims. (Cl. 260—239.5)

This invention relates to an improvement in the conversion of steroid-22-aldehydes to 20-ketosteroids and to important intermediates in said conversion. The invention more particularly relates to the synthesis of 20-ketosteroids from steroid-22-aldehydes by a series of reactions involving the preparation of a steroid 22-enamine, i. e., a steroid 20:22-ene-22-amine, ozonolysis and decomposition of the ozonide to form a 20-ketosteroid, as outlined schematically in the following illustrative diagram wherein P— represents a 10,13-dimethyl cyclopentanoperhydrophenanthrene nucleus and —N͡Z represents a secondary amine radical in which Z represents the atoms necessary to complete two alkyl, hydroxyalkyl or aralkyl radicals or a heterocyclic ring system.

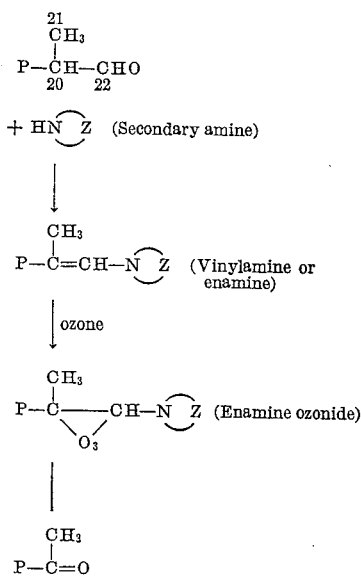

As indicated in the foregoing diagram, a 20-ketosteroid can be obtained by means of a relatively simple synthesis involving enamine formation of a steroid 22-aldehyde to produce a vinylamine derivative thereof, ozonolysis of the 20:22-double bond of the derivative thus formed, decomposition of the 20:22 ozonide, and separation of the 20-ketosteroid.

The principal object of the present invention is to provide an improved method for the synthesis of 20-ketosteroids, particularly with respect to yields and economy of operation. Another object of the invention is the provision of a process which proceeds from a steroid 22-aldehyde through the formation of an enamine, ozonolysis of the enamine and decomposition of the resulting ozonide to produce a 20-ketosteroid. A still further object of the present invention is the provision of novel 20:22-unsaturated steroid enamine. Other objects, some of which are referred to hereinafter, will become apparent to those skilled in the art to which the invention pertains.

The steroid 22-aldehydes which are used as starting compounds in the process of the present invention can be prepared by the selective ozonization of the 22:23 double bond of an unsaturated steroid in the presence of a tertiary amine to form an aldehyde as described by Heyl, Centolella, and Herr, J. A. C. S. 69, 1957 (1947) and 70, 2953 (1948).

The first step in the method of this invention is the formation of an enamine of a steroid 22-aldehyde, the 20:22-double bond of which is oxidized in the next step. It is of critical importance that the enol form of the 22-aldehyde compound be present. Under ordinary conditions, the 22-aldehyde group exists in its enolic form in steroids of this type to only a slight extent, the tautomeric aldehyde form predominating. However, I have found that it is possible to convert the aldehyde completely into its enolic form by forming a stable enolic enamine derivative thereof. These enamine derivatives are preferably prepared by heating the steroid 22-aldehyde with a secondary amine which can be represented by the formula HN͡Z, wherein Z has the significance hereinbefore assigned, in an organic solvent, removing the water as it is formed in the course of the reaction, and isolating the enamine thus formed. The water that is formed can be removed by azeotropic distillation or by a basic inorganic water-binding agent such as potassium carbonate, calcium oxide, barium oxide and the like. Alternatively, the enamines can be prepared advantageously by contacting the steroid 22-aldehyde with at least two molecular proportions of a secondary amine at about room temperature, removing the water as it is formed, separating the aldehyde-diamine complex thus formed and heating it to between approximately 40 and approximately 90 degrees centigrade in order to split out one of the amine groups, thereby introducing the desired 20:22 double bond. Conditions for the formation of such enamines include an inert atmosphere, such as nitrogen, and a reaction temperature between approximately 25 and approximately 125 degrees centigrade, preferably between 40 and 110 degrees centigrade and conveniently at the reflux temperature of the reaction mixture, but always below the decomposition temperature of the ultimate reaction product, i. e., the enamine. The reaction time varies according to the reactivity of the amine and the temperature of the reaction; the heterocyclic amines such as piperidine are most reactive, the dialkylamines being intermediate, and the arylalkylamines are least reactive. Ordinarily a reaction period of from about 2 to 40 hours is most satisfactory when a temperature within the preferred range is employed. However, if desired, the course of the reaction can be followed by spectroscopic analysis. Among the solvents which can be used are diethyl ether, tetrahydrofuran, an excess of the amine, benzene, xylene, toluene, pentane, hexane and the like.

The enamines thus obtained are usually well-defined crystalline solids which are soluble in methanol, ethanol, chloroform, and the like; they are moderately soluble in acetone, diethyl ether, and the like but insoluble in water. They also form crystalline acid-addition salts of unknown structure from which the enamine can be recovered by mild treatment with an inorganic base.

Representative secondary amines (HN͡Z in the foregoing formulae) which can be employed in the preparation of steroid enamines from steroid 22-aldehydes include dialkylamines such as diethylamine, dibutylamine, dioctylamine, and didodecylamine; cycloalkylamines such as dicyclohexylamine and the like; cyclic amines such as piperidine, pyrrolidine, tetrahydroquinoline, oxazolidine (tetrahydro-oxazole), morpholine and the like; aralkylalkylamines such as N-methylbenzylamine, dibenzylamine and the like; substituted dialkylamines such as diethanolamine and the like; and arylalkylamines such as N-methylaniline, N-methyltoluidine, N-methylanisidine, and the like. However, it is preferred, for convenience and economy, to use secondary amines whose molecular weights are between approximately 70 and approximately 150, such as pyrrolidine, piperidine, morpholine and diethylamine.

Representative steroid aldehydes which can be used in the method of the present invention include bisnorcholan-22-al, 3-acetoxybisnorcholan-22-al, 3-benzoxybisnorcholan-22-al, 3-alpha-naphthoxybisnorcholan-22-al, 3-methoxybisnorcholan-22-al, 3-benzyloxybisnorcholan-22-al, 3-hydroxybisnorcholan-22-al, 3-ketobisnorcholan-22-al, 3-acetoxybisnor-5-cholen-22-al, 3-n-butyroxybisnor-5-cholen-22-al, 3-phenylacetoxybisnor-5-cholen-22-al, 3-isopropyloxybisnor-5-cholen-22-al, 3-hydroxybisnor-5-cholen-22-al and the i ethers thereof, 3-ketobisnor-4-cholen-22-al, the maleic anhydride, maleimide, and maleic ester adducts of bisnor-5,7-choladien-22-al, 3-acetoxybisnor-5,7-choladien-22-al, 3-benzoxybisnor-5,7-choladien-22-al, 3-ethoxybisnor-5,7-choladien-22-al, 3-triphenylmethoxybisnor-5,7-choladien-22-al, 3-hydroxybisnor-5,7-choladien-22-al, 3-ketobisnor-5,7-chloadien-22-al, bisnor-5,7,9-cholatrien-22-al, 3-propionoxybisnor-5,7,9-cholatrien-22-al, 3-benzyloxybisnor-5,7,9-cholatrien-22-al, 3-hydroxybisnor-5,7,9-cholatrien-22-al, 3-ketobisnor-5,7,9-cholatrien-22-al, 3-acetoxy-9,11-oxidobisnor-5,7-choladien-22-al, 3-n-hexyloxy-9,11-oxidobisnor-5,7-choladien-22-al, 3-hydroxy-9,11-oxidobisnor-5,7-choladien-22-al, 3-keto-9,11-oxidobisnor-5,7-choladien-22-al, and the like. The foregoing and similar steroid aldehydes which can be reacted in accordance with the process of the invention can be prepared by methods heretofore described in the art. The preparation of the 3-hydroxy, 3-acetoxy, 3-methoxy, 3-benzyloxy and the i-methyl ether bisnor-5-cholen-22-als are described by Heyl, Centolella and Herr in J. A. C. S. 69, 1957 (1947) and 70, 2953 (1948). 3-keto-bisnor-4-cholen-22-al and a method for its preparation is described by Heyl and Herr in J. A. C. S. 72, 2617 (1950). The maleic anhydride adducts of 3-acetoxybisnor-5,7-choladien-22-al and 3-acetoxy-9,11-oxidobisnor-5,7-choladiene-22-al and methods for their preparation are described by Bergmann in J. Ore. Chem. 13, 10–20 (1948) and adducts of 3-ketobisnor-5,7,9(11)-cholatrien-22-al and methods for their preparation are described in the patent of Levin and McIntosh, No. 2,530,389, granted November 21, 1950.

Since the steroid enamines can be considered as substituted ethylenes, they are capable of existing in both cis and trans forms. Due to the difficulty of obtaining both forms in a highly purified state, a preferred modification of this invention contemplates the use of the said steroid enamines in the subsequent steps without separation and purification of the two isomers.

The next step in the process of this invention is the addition of one molar equivalent of ozone to the 20:22 double bond of a steroid enamine without at the same time adding ozone to any other double bond or bonds that are present in the nucleus. This can conveniently be accomplished by passing ozone into a solution of the 20:22-unsaturated steroid enamine at a temperature below approximately 30 degrees centigrade, preferably between approximately 0 and approximately minus 30 degrees centigrade, according to conventional methods of ozonization, until one molecular proportion of ozone has been added. The introduction into the reaction mixture of appreciably more ozone than necessary to form a monoozonide results in a lowering of the yield of the desired ozonide due to undesirable secondary reactions brought about by the excess ozone.

Some of the common solvents used in ozonization, for example, chloroform, destroy part of the ozone so that a determination of the total quantity of ozone to be introduced into the reaction mixture should compensate for this loss to the solvent. The total quantity of ozone usually introduced into the reaction mixture is from 1 to 1.5, preferably 1.1 to 1.3, moles of ozone per mole of steroid enamine over and above any which may be lost to the solvent, or from 1.1 to 2 moles of ozone per mole of steroid enamine including the amount lost to the solvent, the exact quantity which will be lost to the solvent being, of course, dependent upon the particular solvent used.

Representative solvents which can be used for the ozonization include ether, chloroform, carbon tetrachloride, mixtures of ether and chloroform, methylene chloride, ethyl acetate, and hexane, diethyl ether being preferred.

The monoozonide, if desired, may be isolated from the solvent in which it was formed prior to the subsequent decomposition step, in conventional manner, but a preferred form of the invention contemplates the more usual procedure of reductive decomposition of the solution of the ozonide without isolation of the ozonide therefrom. The reductive decomposition of the ozonide is, of course, only one method of decomposing the ozonide; other methods of decomposition also produce the desired C-20 ketone.

The decomposition of the ozonide can be accomplished by treatment of the ozonide by any of the usual decomposition procedures, namely, by steam distillation, or by adding the ozonide to boiling acetic or propionic anhydride, to liquid amonia, to a concentrated aqueous solution of potassium bisulfite, to a dilute solution of sodium bisulfite, to a mixture of powdered zinc and water, or to a mixture of powdered zinc and glacial acetic acid, the reductive decomposition with zinc and acetic acid being preferred.

The solvent used for the ozonization can be partially or completely replaced by glacial acetic acid after completion of the ozonization by adding glacial acetic acid to the ozonide solution and removing the lower-boiling solvent by fractional distillation at subatmospheric pressure, with introduction of additional acetic acid, if necessary. Or, if desired, the ozonide can be isolated as previously mentioned and then dissolved in glacial acetic acid, or a mixture of glacial acetic acid and another suitable solvent such as ether. Other conventional solvents such as propionic anhydride can be used to replace the solvent glacial acetic acid for the decomposition of the ozonide. By "reductive decomposition" is to be understood decomposition in such manner that the excess oxygen formed by decomposition of the ozonide is prevented from forming hydrogen peroxide by combination with moisture, and the molecular oxygen is prevented from oxidizing the C-20 ketone thus formed. The addition of a small quantity of alcoholic silver nitrate, from which molecular silver is formed during the decomposition, aids in the rapid decomposition of any hydrogen peroxide which may form. Other finely divided metals such as silver, magnesium, platinum, or non-oxidizing ozonide decomposing agent, may also be employed. The use of "reductive conditions" and the decomposition of ozonide are disclosed in the art; for further details, reference is directed to Hill and Kelly "Organic Chemistry," page 63, The Blakiston Company, Philadelphia (1943); Gilman, "Organic Chemistry," page 636, 2nd edition, John Wiley and Sons, New York (1943); Church et al., J. A. C. S. 56, 176–184 (1934); and Long, Chemical Reviews 27, 452–454 (1940).

The 20-ketosteroids produced in accordance with the foregoing process can be isolated by conventional techniques. If the zinc and acetic acid process was used, the 20-ketosteroids can be isolated by filtering off the zinc and diluting the acetic acid solution with water. Or preferably, after filtering off the zinc, diluting the acetic acid solution with several volumes of ether, washing the ether layer successively with water and dilute sodium carbonate solution, drying, and removing the solvent. The crystalline ketones thus obtained are suitable for further chemical transformation or, if desired, can be further purified by recrystallization from an appropriate solvent.

It is to be understood that, although the present invention has been described with respect to compounds having various substituents on the steroid nucleus, its scope is not to be limited to those specific compounds. The following examples are given by way of illustration only and are not to be construed as limiting.

*Example 1.—Preparation of progesterone without isolation of the intermediate enamine*

A solution of 2.2 milliliters (1.1 molar equivalents) of piperidine and 25 milliliters of anhydrous thiophene-free benzene was added at a uniform rate over a period of approximately 5 minutes to a stirred mixture of 3.29 grams of barium oxide, 6.57 grams of bisnor-4-cholen-3-on-22-al (prepared as described by Heyl and Herr in J. A. C. S., 72, 2617) and 75 milliliters of dry thiophene-free benzene in an atmosphere of nitrogen. Stirring was continued and the mixture was heated under reflux for 3 hours, cooled and filtered. The filter cake was washed with about 10 milliliters of benzene, the filtrates combined and concentrated at a subatmospheric pressure while keeping the distillation temperature below about 30 degrees centigrade. The resulting syrupy residue was then heated at about 40 to 50 degrees centigrade for about 30 minutes during which period it changed to a light-colored crystalline solid. The 22-piperidinobisnor-4,20:22-choladien-3-one thus formed was then dissolved in 360 milliliters of anhydrous diethyl ether and ozonized as described hereinbefore with 1.2 molar equivalents of ozone over a period of 40 minutes. The resulting ozonide was not isolated from the solution, to which 50 milliliters of glacial acetic acid were added, followed by 7.5 grams of zinc dust and the resulting mixture was heated under reflux for about 10 minutes. The mixture was then filtered, the filter cake washed with 100 milliliters of ether and the filtrates combined. The ether solution was then washed successively with one 100-milliliter and three 50-milliliter portions of ice water, two 50-milliliter portions of 10 percent aqueous sodium hydroxide solution and four 50-milliliter portions of ice water. The washed ethereal solution was then warmed on a steam bath under reduced pressure to remove the organic solvent, whereupon 5.78 grams of crude progesterone was obtained. The crude progesterone was then dissolved in 50 milliliters of methanol, diluted with 50 milliliters of diethyl ether and shaken with 75 milliliters of 40 percent aqueous sodium bisulfite solution for 1 hour. The layers were separated and the aqueous layer was extracted with one 100-milliliter portion of ether followed by two 50-milliliter portions of ether. The ether solutions were combined and washed successively with 50 milliliters of 10-percent aqueous sodium hydroxide solution, four 50-milliliter portions of water, dried and the solvent removed to obtain 4.95 grams of progesterone. The product was recrystallized from 12 milliliters of ether to obtain 3.36 grams (53.5 percent of theory) of progesterone which had a melting point of 124 to 128 degrees centigrade.

*Example 2.—Preparation of 22-piperidinobisnor-4,20:22-choladien-3-one*

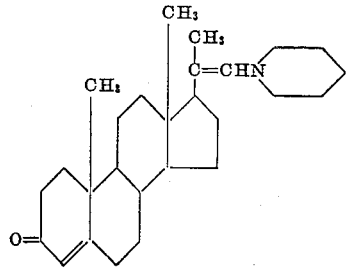

A mixture of 41.3 grams of bisnor-4-cholen-3-on-22-al (prepared as described by Heyl and Herr in J. A. C. S., 72, 2617), 800 milliliters of thiophene-free benzene and 25 milliliters of piperidine was placed in a still-pot equipped with a reflux condenser so arranged that the condensed vapors passed through 80 grams of adsorbent anhydrous aluminum oxide particles before returning to the reaction zone, and the mixture was heated under reflux for 2 hours under an atmosphere of nitrogen. The benzene was then removed at subatmospheric pressure, the residue was thoroughly agitated with 160 milliliters of methanol, the methanolic extract was then cooled to about 4 degrees centigrade for 3½ hours, filtered, and the filter cake washed with about 10 milliliters of cold methanol and dried to obtain 33 grams of 22-piperidinobisnor-4,20:22-choladien-3-one which had a melting point of 130 to 133 degrees centigrade. Upon further cooling of the filtrate, an additional 2.5 grams of material having essentially the same melting range was obtained to give a total yield of 35.5 grams (73 percent of theory).

*Analysis.*—Calc'd for $C_{27}H_{41}ON$: C, 82.0; H, 10.4; N, 3.54. Found: C, 81.9; H, 10.3; N, 3.78.

*Example 3.—Ozonization of 22-piperidinobisnor-4,20:22-choladien-3-one to produce progesterone*

A mixture of 75 milliliters of anhydrous ether and 0.83 gram of 22-piperidinobisnor-4,20:22-choladien-3-one (Example 2) was cooled to about minus 25 degrees centigrade and ozonized for 16 minutes at a rate of 9.6 milligrams ozone per minute (1.52 molar equivalents). The ozonized solution was then concentrated at subatmospheric pressure and at a temperature below 30 degrees centigrade to one-half of its original volume. Twenty (20) milliliters of glacial acetic acid and 2 grams of zinc dust was added, and the mixture stirred and warmed to about 80 degrees centigrade for 10 minutes. The mixture was then diluted with 150 milliliters of ether, filtered, and the filter cake washed with about 50 milliliters of ether. The ether extracts were combined and washed successively with equal volumes of water, cold 10-percent aqueous sodium hydroxide solution and water, dried and the solvent removed at subatmospheric pressure to obtain 0.6 gram of crystalline material. The progesterone thus obtained was recrystallized from 8 milliliters of 50-percent aqueous, methanol to obtain 0.51 gram (76 percent of theory) of progesterone which melted at 120 to 122 degrees centigrade. A second recrystallization gave analytically pure progesterone which had a melting point of 126 to 129 degrees centigrade.

*Example 4.—Preparation of 3-acetoxy-22-piperidinobisnor-5,20:22-choladiene*

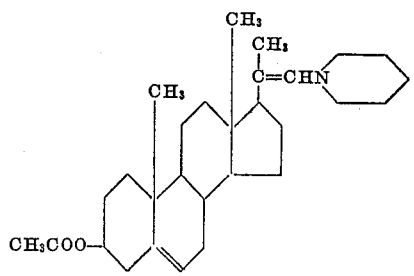

A mixture of 6.2 grams of 3-acetoxybisnor-5-cholen-22-al (prepared as described by Heyl, Centolella and Herr, loc. cit.), 2 grams of anhydrous potassium carbonate and 25 milliliters of anhydrous piperidine was heated and stirred in an atmosphere of nitrogen at 50 degrees centigrade for 3 hours. The reaction mixture was then cooled, diluted with 100 milliliters of ethyl ether, filtered, and the filter cake washed with about 50 milliliters of ether. The organic extracts were combined and the solvent removed at subatmospheric pressure on a hot water bath. The oily residue was then heated to 90 degrees centigrade for about 50 minutes at 0.7 millimeter pressure, whereupon it set up to a waxy solid. The crystalline enamine thus formed has crystallized from about 50 milliliters of boiling acetone to obtain 3.59 grams of 3 - acetoxy - 22-piperidinobisnor-5,20:22-choladiene which melted at 132 to 138 degrees centigrade. The filtrate was then evaporated to dryness and the residue dissolved in 15 milliliters of warm ethanol and cooled to obtain an additional 0.71 gram of material, constituting a total yield of 4.3 grams (59 percent of theory) of 3 - acetoxy - 22 - piperidinobisnor-5,20:22-choladiene. A small sample which was recrystallized from acetone analyzed as follows:

Analysis.—Calc'd for $C_{29}H_{45}O_2N$: C, 79.2; H, 10.3; N, 3.19. Found: C, 79.2; H, 9.9; N, 3.37.

Example 5.—Ozonization of 3-acetoxy-22-piperidinobisnor-5,20:22-choladiene

A solution of 3.5 grams of 3-acetoxybisnor-5-cholen-22-al in 30 milliliters of anhydrous ether was added dropwise at a uniform rate over a period of about 15 minutes to a stirred mixture of 7 milliliters of anhydrous ethyl ether, 0.5 gram of anhydrous potassium carbonate and 0.5 gram of anhydrous piperidine in an atmosphere of nitrogen at room temperature. The mixture was stirred under the nitrogen atmosphere for an additional 15 minutes, 100 milliliters of anhydrous ether was added and the mixture filtered. The organic extract was then dried and the solvent evaporated by heating the reaction mixture at subatmospheric pressure on a steam bath at approximately 100 degrees centigrade for about 30 minutes. The solid residue, which weighed 3.06 grams, was dissolved in 100 milliliters of ether. Fifty (50) milliliters of the above ethereal solution was evaporated to dryness, the residue dissolved in 50 milliliters of chloroform and ozonized in ice water for 11 minutes, a total of 170 milligrams (1.1 molar equivalents) of ozone being used. The ozonized solution was then concentrated at subatmospheric pressure while maintaining the temperature below 30 degrees centigrade, 20 milliliters of glacial acetic acid was added, followed by 1 gram of zinc dust. The mixture was then warmed to about 80 degrees for 10 minutes, an equal volume of ether added, and the mixture filtered. The ether extract was then washed successively with equal volumes of cold water, 10 percent aqueous sodium hydroxide solution and water and then dried. The solvent was then removed at subatmospheric pressure to obtain 1.22 grams of a light-colored gum which was then dissolved in a mixture of 30 milliliters of methanol, 8 milliliters of water, 1 gram of semicarbazone hydrochloride and 1 gram of sodium acetate. The resulting mixture was refluxed for 30 minutes and the crystals which had formed were filtered off. The filter cake was then recrystallized from a small amount of methanol and chloroform to obtain 0.26 gram of pregnenolone acetate-semicarbazone which had a melting point of 233 to 236 degrees centigrade.

Example 6.—Preparation of 3-hydroxy-22-piperidinobisnor-5,20:22-choladiene

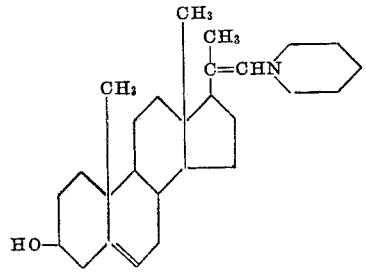

A mixture of 15 milliliters of anhydrous benzene, 1 milliliter of piperidine, 1 gram of calcium oxide and 1 gram of 3-hydroxybisnor-5-cholen-22-al (prepared as described by Heyl, Centolella and Herr, loc. cit.), was heated under reflux in an atmosphere of nitrogen with stirring for 15 minutes. The mixture was stirred for an additional 15 minutes, 50 milliliters of diethyl ether was added and the mixture filtered. The filter cake was washed twice with 25-milliliter portions of ether and the organic extracts combined. The solvents were removed by heating the solution on a steam bath at subatmospheric pressure. The residue was then dissolved in 100 milliliters of ether and washed with an equal volume of dilute aqueous hydrochloric acid. The crystalline hydrochloride which formed was separated by centrifugation and washed twice with a small quantity of ether. The hydrochloride was then shaken with a mixture of dilute aqueous sodium carbonate solution and ether. The ether extract was washed with water until the aqueous washes had a pH of approximately 7.0. The organic extracts were then dried and the solvent removed by distillation at subatmospheric pressure to obtain 200 milligrams of a white crystalline solid. This residue was then recrystallized from a small amount of methanol to obtain 3-hydroxy - 22 - piperidinobisnor-5-20:22-choladiene which had a melting point of 93 to 111 degrees centigrade.

Analysis.—Calc'd for $C_{27}H_{43}ON$: N, 3.52. Found: N, 3.68, 3.79.

The ether solution from the preparation of the hydrochloride was washed with dilute sodium carbonate solution, water, and dried. Evaporation of the solvent gave 0.65 gram of recovered 3-hydroxybisnor-5-cholen-22-al.

Example 7.—Preparation of 3-keto - 22 - dibenzylaminobisnor-4,20:22-choladiene

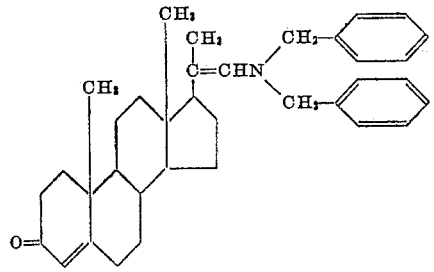

A mixture of 2.0 grams of bisnor-4-cholen-3-on-22-al (prepared as described by Heyl and Herr, J.A.C.S. 72 2617), 35 milliliters of anhydrous benzene and 3.4 milliliters (2 molar equivalents) of dibenzylamine was heated under reflux in an atmosphere of nitrogen for 1 hour. The solvent was then removed by distillation at subatmospheric pressure to obtain a light-colored crystalline solid mixed with unreacted dibenzylamine. A small portion of the crystalline residue was washed with ether and its physical characteristics were determined and found to correspond to those of the starting bisnor-4-cholen-3-on-22-al. The remainder of the crystalline magma was dissolved in 35 milliliters of toluene and heated under reflux in an atmosphere of nitrogen for 4½ hours in a still-pot equipped with water-separation means. The solvent was then removed by distillation at subatmospheric pressure to obtain 22-dibenzylaminobisnor-4,20:22-choladien-3-one as a viscous oil which could not be crystallized from diethyl ether, acetone, methanol, or a mixture of hexane and methanol.

Example 8.—22 - morpholinobisnor-4,20:22-choladien-3-one

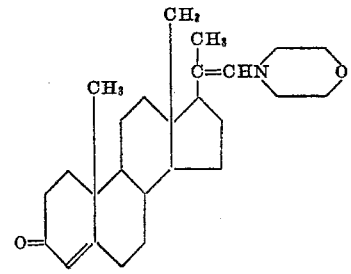

A mixture of 6.57 grams of barium oxide, 6.57 grams of 3-keto-bisnor-4-cholen-22-al (prepared as described by Heyl and Herr, J.A.C.S. 72, 2617), 1.92 milliliters of morpholine and 100 milliliters of toluene was stirred for 10 minutes at room temperature in an atmosphere of nitrogen and then heated under reflux for 2¾ hours with continued stirring. The mixture was then cooled, filtered and the filter cake washed with about 15 milliliters of benzene. The organic filtrates were then combined and the solvents removed by distillation at subatmospheric pressure to obtain 8.19 grams of crude material from which 6.66 grams (84 percent) of 22-morpholinobisnor-4,20:22-choladien-3-one having a melting point of 156 to 157 degrees centigrade was obtained by trituration with 24 milliliters of cold acetone.

*Analysis.*—Calc'd for $C_{26}H_{39}O_2N$: C, 78.7; H, 9.89; N, 3.52. Found: C, 79.0; H, 9.70; N, 3.58.

Ozonization of 1.99 grams of 22-morpholinobisnor-4,20:22-choladien-3-one at minus 70 degrees centigrade with 1.2 molar equivalents of ozone followed by reduction of the ozonide with zinc and acetic acid as described in Example 3 hereinbefore gave progesterone in an 84 percent yield.

*Example 9.—Preparation of other enamines*

The following enamines can be prepared in manners essentially as described in the examples hereinbefore:

(a) 22-diethylaminobisnor-20:22-cholene by heating bisnorcholan-22-al with a slight excess of diethylamine.

(b) 3 - acetoxy - 22-di-n-butylaminobisnor-20:22-cholene by heating 3-acetoxybisnorcholan-22-al with a slight excess of di-n-butylamine.

(c) 3 - benzoxy - 22 - dioctylaminobisnor-20:22 - cholene by heating 3-benzoxybisnorcholan-22-al with a slight excess of dioctylamine.

(d) 3 - alpha - naphthoxy - 22 - didodecylaminobisnor-20:22-cholene by heating 3-alpha-naphthoxybisnorcholan-22-al with a slight excess of didodecylamine.

(e) 3 - methoxy - 22 - dicyclohexylaminobisnor-20:22-cholene by heating 3-methoxybisnorcholan-22-al with a slight excess of dicyclohexylamine.

(f) 3 - benzyloxy - 22 - piperidinobisnor - 20:22 - cholene by heating 3-benzyloxybisnorcholan-22-al with a slight excess of piperidine.

(g) 3 - hydroxy - 22 - pyrrolidinobisnor - 20:22 - cholene by heating 3-hydroxybisnorcholan-22-al with a slight excess of pyrrolidine.

(h) 3 - keto - 22 - tetrahydroquinolinobisnor - 20:22-cholene by heating 3-ketobisnorcholan-22-al with a slight excess of tetrahydroquinoline.

(i) 3 - n - butyroxy - 22 - oxazolidinobisnor - 5,20:22-choladiene by heating 3-n-butyroxybisnor-5-cholen-22-al with a slight excess of oxazolidine.

(j) 3 - phenylacetoxy - 22 - morpholinobisnor - 5,20:22-choladiene by heating 3-phenylacetoxybisnor-5-cholen-22-al with a slight excess of morpholine.

(k) 3 - isopropyloxy - 22 - N - methylbenzylaminobisnor-5,20:22-choladiene by heating 3-isopropyloxybisnor-5-cholen-22-al with a slight excess of N-methylbenzylamine.

(l) The dimethyl maleate adduct of 22-dibenzylaminobisnor-5,7,20:22-cholatriene by heating the dimethyl maleate adduct of bisnor-5,7-choladien-22-al with a slight excess of dibenzylamine.

(m) The maleic anhydride adduct of 3-acetoxy-22-diethanolaminobisnor-5,7,20:22-cholatriene by heating 3-acetoxybisnor-5,7-choladien-22-al with a slight excess of diethanolamine.

(n) The diethyl maleate adduct of 3-benzoxy-22-(2-methyl-pyrrolidino)bisnor-5,7,20:22-cholatriene by heating the diethyl maleate adduct of 3-benzoxybisnor-5,7-choladien-22-al with a slight excess of 2-methylpyrrolidine.

(o) The di-n-butyl maleate adduct of 3-ethoxy-22-(2-methylpiperidino)-bisnor-5,7,20:22-cholatriene by heating the di-n-butyl maleate adduct of 3-ethoxybisnor-5,7-choladien-22-al with a slight excess of 2-methylpiperidine.

(p) The dibenzyl maleate adduct of 3-triphenylmethoxy - 22 - (3-methylpiperidino)-bisnor-5,7,20:22-cholatriene by heating 3-triphenylmethoxybisnor-5,7-choladien-22-al with a slight excess of 3-methylpiperidine.

(q) The maleimide adduct of 3-hydroxy-22-oxazolidinobisnor-5,7,20:22-cholatriene by heating the maleimide adduct of 3-hydroxybisnor-5,7-choladien-22-al with a slight excess of oxazolidine.

(r) The maleic anhydride adduct of 3-keto-22-morpholinobisnor-5,7,20:22-cholatriene by heating the maleic anhydride adduct of 3-ketobisnor-5,7-choladien-22-al with a slight excess of morpholine.

(s) The dimethyl maleate adduct of 3-propionoxy-22-piperidinobisnor-5,7,9,20:22-cholatetraene by heating 3-propionoxybisnor - 5,7,9 - cholatrien-22-al with a slight excess of piperidine.

(t) The maleic anhydride adduct of 3-keto-22-(2-methylpyrrolidino)-bisnor-5,7,9,20:22-cholatetraene by heating the maleic anhydride adduct of 3-ketobisnor-5,7,9-cholatrien-22-al with a slight excess of 2-methylpyrrolidine.

(u) The dimethyl maleate adduct of 3-acetoxy-9,11-oxido-22-N-methylanilinobisnor-5,7,20:22-cholatriene by heating the dimethyl maleate adduct of 3-acetoxy-9,11-oxidobisnor-5,7-choladien-22-al with a slight excess of N-methylaniline.

(v) 3 - hydroxy - 22 - N-methylanisidinobisnor-5,7,9,-20:22-cholatetraene by heating 3 - hydroxybisnor - 5,7,9-cholatrien-22-al with a slight excess of N-methylanisidine.

(w) The dimethyl maleate adduct of 3,12-diacetoxy-22-morpholinobisnor - 5,7,9,20:22-cholatetraene by heating the dimethyl maleate adduct of 3,12-diacetoxybisnor-5,7,9-cholatrien-22-al with a slight excess of morpholine.

*Example 10.—Further ozonizations*

In a manner essentially as described in the examples hereinbefore, the following 20-ketosteroids can be prepared from the corresponding 22-enamines.

(a) Pregnan-20-one can be prepared by ozonizing 22-diethylaminobisnor-20:22-cholene with about 1.1 molar equivalents of ozone and decomposing the ozonide.

(b) acetoxypregnan-20-one can be prepared by ozonizing 3 - acetoxy - 22-di-n-butylaminobisnor-20:22-cholene with about 1.1 molar equivalents of ozone and decomposing the ozonide.

(c) 3-methoxypregnan-20-one can be prepared by ozonizing 3 - methoxy-22-dicyclohexylaminobisnor-20:22-cholene with about 1.1 molar equivalents of ozone and decomposing the ozonide.

(d) 3-hydroxypregnan-20-one can be prepared by ozonization of 3 - hydroxy - 22-pyrrolidinobisnor-20:22-cholene with about 1.1 molar equivalents of ozone and decomposing the resulting ozonide.

(e) Pregnan-3,20-dione can be prepared by ozonization of 3 - keto-22-tetrahydroquinolinobisnor-20:22-cholene with about 1.1 molar equivalents of ozone and decomposing the ozonide thus formed.

(f) 3-butyroxy-5-pregnen-20-one can be prepared by ozonizing 3-butyroxy-22-oxazolidinobinsor-5,20:22-choladiene with about 1.1 moles of ozone at a temperature between about 0 and minus 30 degrees centigrade and decomposing the 20:22 ozonide thus formed.

(g) 3 - isopropoxy - 5 - pregnen - 20 - one can be prepared by ozonizing 3 - isopropoxy - 22 - N - methylbenzylaminobisnor - 5,20:22 - choladiene with about 1.1 molar equivalents of ozone at between about 0 and minus 30 degrees centigrade and decomposing the 20:22 ozonide thus formed.

(h) The dimethyl maleate adduct of 5,7-pregnadien-20-one can be prepared by ozonizing the dimethyl maleate adduct of 22 - dibenzylaminobisnor - 5,7,20:22-cholatriene with about 1.1 molar equivalents of ozone at between about 0 and minus 30 degrees centigrade and decomposing the 20:22 ozonide thus formed.

(i) The maleic anhydride adduct of 3 - acetoxy - 5, 7 - pregnadien-20-one can be prepared by ozonizing the maleic anhydride adduct of 3 - acetoxy - 22 - diethanolaminobisnor - 5,7,20:22-cholatriene with about 1.1 molar equivalents of ozone at between about 0 and minus 30 degrees centigrade and decomposing the 20:22 ozonide thus formed.

(j) The maleic anhydride adduct of 5,7 - pregnadiene-3,20-dione can be prepared by the ozonization of the maleic anhydride adduct of 3 - keto - 22 - morpholinobisnor - 5,7,20:22 - cholatriene with about 1.1 molar equivalents of ozone at between about 0 and minus 30 degrees centigrade and decomposing the 20:22 ozonide thus formed.

(k) The dimethyl maleate adduct of 3 - propionoxy-5,7,9 - pregnatrien - 20 - one can be prepared by ozonizing the dimethyl maleate adduct of 3 - propionoxy - 22 - piperidinobisnor - 5,7,9,20:22 - cholatetraene with about 1.1 molar equivalents of ozone at between about 0 and minus 30 degrees centigrade and decomposing the 20:22 ozonide thus formed.

(l) The dimethyl maleate adduct of 3 - acetoxy - 9, 11 - oxido - 5,7 - pregnadien - 20 - one can be prepared by ozonizing the dimethyl maleate adduct of 3 - acetoxy-9,11 - oxido - 22 - N - methyl - anilinobisnor - 5,7,20:22-cholatriene with about 1.1 molar equivalents of ozone at between about 0 and minus 30 degrees centigrade and decomposing the 20:22 ozonide thus formed.

Inasmuch as the foregoing specification comprises preferred embodiments of the invention, it is to be understood that the invention is not limited thereto and that variations and modifications can be made in conventional manner by those skilled in the art without departing from the scope of this invention or the claims hereinafter.

I claim:

1. A process for the introduction of a 20:22 double bond in a steroid compound which includes: forming a 20:22-ene-22-tertiaryamino steroid by heating a steroid 22-aldehyde with a secondary amine at a temperature between approximately 25 and approximately 125 degrees centigrade.

2. A process for the introduction of a 20-keto group into a steroid compound which includes: contacting a steroid 22-aldehyde with a secondary amine at a temperature between approximately 25 and approximately 125 degrees centigrade, separating the water as it is formed in the course of the reaction, ozonizing the 20:22 double bond of the resulting steroid which has a tertiary amine radical in the 22 position at a temperature below approximately 30 degrees centigrade until the 20:22 ozonide thereof is formed.

3. A process for the degradation of a steroid side-chain which includes: forming a 22-tertiaryamino-20:22-unsaturated steroid by heating a steroid 22-al with a secondary amine, ozonizing the 20:22 double bond of the compound thus formed at a temperature below approximately 30 degrees centigrade until the 20:22 ozonide thereof is formed, and decomposing the ozonide to form a 20-ketosteroid compound.

4. A process for the introduction of a 20:22 double bond into a steroid molecule which includes contacting a steroid 22-aldehyde with a secondary amine and continuously removing the water thus formed during the course of the reaction.

5. A process for the preparation of a 20-ketosteroid which includes the step of heating a steroid 22-aldehyde with a secondary cyclic amine at a temperature between approximately 25 and approximately 100 degrees centigrade.

6. A process as defined in claim 5 wherein the cyclic amine is piperidine.

7. A process as defined in claim 5 wherein the cyclic amine is morpholine.

8. A process for the degradation of a steroid side-chain which includes: heating a steroid 22-aldehyde with a secondary cyclic amine at a temperature between approximately 40 and approximately 110 degrees centigrade, ozonizing the 20:22 double bond of the enamine thus formed, decomposing the ozonide and recovering the resulting C-20 ketone.

9. A process for the production of a 20-ketosteroid compound which includes: heating a steroid 22-aldehyde with a secondary cyclic amine at between approximately 25 and approximately 125 degrees centigrade for a period between approximately 15 minutes and approximately 40 hours, ozonizing the 20:22 double bond of the enamine thus formed at a temperature between about plus 30 and minus 30 degrees centigrade, decomposing the ozonide and recovering the resulting C-20 ketone.

10. A process as defined in claim 9 wherein the cyclic amine is piperidine.

11. A process as defined in claim 9 wherein the cyclic amine is morpholine.

12. In a process for the production of a 20-ketosteroid the step which includes heating a steroid 22-aldehyde with a secondary aliphatic amine at a temperature between approximately 40 and approximately 110 degrees centigrade.

13. A process as defined in claim 12 wherein the secondary aliphatic amine is dibenzylamine.

14. A process for the production of a 20-ketosteroid from a steroid 22-aldehyde which includes: heating a steroid 22-aldehyde with dibenzylamine at a temperature of approximately 110 degrees centigrade for about 4 hours, ozonizing the 20:22 double bond of the enamine thus formed, decomposing the ozonide and recovering the resulting 20-ketosteroid.

15. A method for the production of a 20-ketosteroid which includes: heating a steroid 22-aldehyde with a secondary aliphatic amine in an inert water-immiscible organic solvent at a temperature between approximately 40 and approximately 110 degrees centigrade for a period between approximately 15 minutes and ten hours, removing the water as it is formed in the course of the reaction, ozonizing the 20:22 double bond of the enamine thus formed at a temperature between about plus 30 and minus 30 degrees centigrade, decomposing the ozonide and recovering the resulting 20-ketosteroid.

16. A method as defined in claim 15 wherein the secondary aliphatic amine is piperidine.

17. A method as defined in claim 15 wherein the secondary aliphatic amine is morpholine.

18. A method as defined in claim 15 wherein the steroid 22-aldehyde is a bisnorcholen-22-al.

19. A process for the preparation of a 20-ketopregnene which comprises the steps of heating a bisnorcholen-22-al with a secondary amine at a temperature between approximately 40 and approximately 110 degrees centigrade for a period between approximately 1 and approximately 4 hours to form a 22-tertiaryamino-bisnor-4,20:22-choladiene, ozonizing the 20:22 double bond of the said enamine by passing between approximately 1.1 and approximately 1.5 moles of ozone per mole of the enamine into a solution of the enamine at a temperature between approximately plus 30 and approximately minus 30 degrees centigrade, decomposing the ozonide with zinc and acetic acid, and recovering the 20-ketopregnene thus formed.

20. A process as defined in claim 19 wherein the secondary amine is piperidine.

21. A process as defined in claim 19 wherein the secondary amine is morpholine.

22. A process as defined in claim 19 wherein the bisnorcholen-22-al is 3-ketobisnor-4-cholen-22-al.

23. A process as defined in claim 19 wherein the bisnorcholen-22-al is 3-hydroxybisnor-5-cholen-22-al.

24. A process as defined in claim 19 wherein the bisnorcholen-22-al is a 3-acyloxybisnor-5-cholen-22-al.

25. A process as defined in claim 19 wherein the bis-norcholen-22-al is 3-acetoxybisnor-5-cholen-22-al.

26. A 22-enamine having a formula selected from the group consisting of:

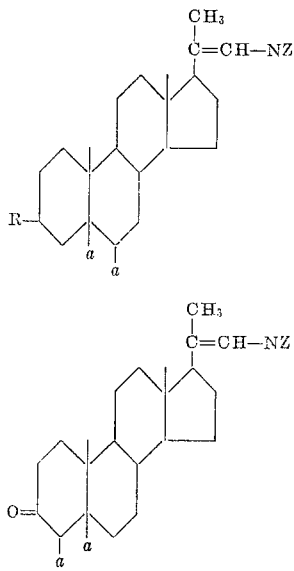

wherein R is selected from the group consisting of hydroxy, acyloxy groups containing the acyl radical of a hydrocarbon carboxylic acid containing up to and including eight carbon atoms, and hydrocarbon ether groups (RO—) containing up to and including nineteen carbon atoms; the bond between the two carbon atoms designated "a" is selected from the group consisting of a single bond and a double bond; and —NZ is a tertiaryamino radical containing up to and including 24 carbon atoms selected from the group consisting of dialkylamino, dicycloalkylamino, diaralkylalkylamino, diarylalkylamino, and saturated monocyclic heterocyclic radicals containing at least five and not more than six ring members, the remainder of the ring besides the nitrogen atom being selected from an alkylene chain and an alkylene chain which is interrupted by an oxygen atom.

27. 3 - acyloxy-22-tertiaryaminobisnor-5,20:22-choladiene wherein the 3-acyloxy group has the formula AcO, Ac being the acyl radical of a hydrocarbon carboxylic acid containing up to and including eight carbon atoms, and wherein the tertiaryamino radical is of the formula —N͡Z, wherein Z represents the necessary atoms which, with N, form a saturated monocyclic heterocyclic radical containing at least five and not more than six ring members.

28. 3 -hydroxy-22-tertiaryaminobisnor-5,20:22-choladiene, wherein the tertiaryamino radical is of the formula —N͡Z, wherein Z represents the necessary atoms which, with N, form a saturated monocyclic heterocyclic radical containing at least five and not more than six ring members.

29. 3 - keto-22-tertiaryaminobisnor-4,20:22-choladiene, wherein the tertiaryamino radical is of the formula —N͡Z, wherein Z represents the necessary atoms which, with N, form a saturated monocyclic heterocyclic radical containing at least five and not more than six ring members.

30. 3-keto-22-piperidinobisnor-4,20:22-choladiene.
31. 3-keto-22-morpholinobisnor-4,20:22-choladiene.
32. 3-keto-22-dibenzylaminobisnor-4,20:22-choladiene.
33. 3-hydroxy-22-piperidinobisnor-5,20:22-choladiene.
34. 3 - acetoxy-22-piperidinobisnor-5,20:22-choladiene.

References Cited in the file of this patent

UNITED STATES PATENTS 2,554,986    Heyl et al. _____ May 29, 1951

OTHER REFERENCES

Fieser et al.: Natural Products Related to Phenanthrene, 3rd ed., pp. 424–26 (1949).
Mannich et al.: Ber. 69B, pp. 2106–12 (1936).